United States Patent [19]

Fischer

[11] Patent Number: 4,704,185

[45] Date of Patent: Nov. 3, 1987

[54] HAND-HELD DISPENSER AND APPLICATOR APPARATUS FOR DISPENSING ADHESIVE LABELS, AND THE LIKE

[75] Inventor: Richard Fischer, Offenbach-Bürgel, Fed. Rep. of Germany

[73] Assignee: Heinrich Hermann GmbH + Co., Stuttgart, Fed. Rep. of Germany

[21] Appl. No.: 785,258

[22] Filed: Oct. 7, 1985

[30] Foreign Application Priority Data

Oct. 5, 1984 [DE] Fed. Rep. of Germany ....... 3436523

[51] Int. Cl.⁴ ........................ B32B 35/00; B65C 11/00

[52] U.S. Cl. .................................... 156/577; 156/579; 156/584

[58] Field of Search ............... 156/541, 574, 577, 579, 156/584, 523, 527, DIG. 48

[56] References Cited

U.S. PATENT DOCUMENTS

| | | | |
|---|---|---|---|
| 2,569,140 | 9/1951 | Avery | 156/577 |
| 3,308,002 | 3/1967 | Hurwich et al. | 156/577 |
| 3,765,992 | 10/1973 | Stageberg | 156/584 |
| 3,839,127 | 10/1974 | Hazuka et al. | 156/577 |
| 3,969,181 | 7/1976 | Seabold | 156/577 |
| 4,576,311 | 3/1986 | Horton et al. | 156/584 |

FOREIGN PATENT DOCUMENTS

| | | |
|---|---|---|
| 2116984 | 4/1979 | Fed. Rep. of Germany . |
| 1312088 | 11/1962 | France . |

OTHER PUBLICATIONS

D. L. Pierson, "Label Attachment Machine", at pp. 2256–2257 in IBM Technical Disclosure Bulletin, vol. 18, No. 7, Dec. 1975.

*Primary Examiner*—Michael Wityshyn

*Attorney, Agent, or Firm*—Theodore J. Koss, Jr.

[57] ABSTRACT

A hand-held dispenser and applicator apparatus dispenses adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces. The apparatus comprises a guide structure defining a guide path for guiding adhesive-element-bearing carrier tape to a dispensing location and from there for guiding away the carrier tape freed of dispensed adhesive elements. An applicator platform, located along the guide path at the dispensing location, faces towards and is freely accessible to workpieces such that an adhesive element on a portion of carrier tape stationarily positioned on the applicator platform can be transferred to the workpiece by the user pressing the platform and thereby the adhesive element stationarily positioned thereon against the exact portion of the workpiece at which such workpiece is to receive the adhesive element. A manually activated intermittent-transport mechanism advances successive adhesive-element-bearing increments of carrier tape along the guide path into position on the applicator platform preliminary to the user pressing the applicator platform and stationarily positioned adhesive element thereon against the desired portion of the workpiece.

32 Claims, 13 Drawing Figures

HAND-HELD DISPENSER AND APPLICATOR APPARATUS FOR DISPENSING ADHESIVE LABELS, AND THE LIKE

BACKGROUND OF THE INVENTION

The present invention concerns hand-held label dispenser and applicator apparatuses designed to dispense photograph-mounting stickers that are adhesive on both faces thereof, adhesive marking labels that are adhesive on one of the faces thereof, or other such adhesive elements that are adhesive on at least one of the faces thereof, from a supply of such adhesive elements adhesively arried on a carrier tape, and furthermore designed to apply such adhesive elements to photo-album pages or to photographs, to documents, cartons, or to other such workpieces.

West German Pat. No. DE-PS 2,116,984, commonly owned, discloses a hand-held dispenser and applicator apparatus for dispensing, for example, photo-mounting stickers that are adhesive on both faces thereof and applying them to the backs of photos or to photo-album pages, for mounting photos in such albums. This is likewise the area of chief concern in the present disclosure, although self-evidently analogous singly- or doubly-adhesive elements can be dispensed and applied within the scope of the present disclosure.

In the apparatus disclosed in the aforementioned West German patent, an adhesive-element-bearing carrier tape is guided over a deflection or peel-off edge, the adhesive elements becoming peeled from the carrier tape and then, by means of an applicator roller, being applied to the workpiece. This applicator roller also serves to effect transport or feeding of adhesive-element-bearing carrier tape when the applicator roller is rolled across the surface of a workpiece. Of disadvantage is the fact that exact positioning and application of the adhesive element to a predetermined location on the workpiece can be successfully performed only if the user of the apparatus has had considerable practice. The same applies to the hand-held dispensing apparatus of U.S. Pat. No. 2,569,140, in which it is furthermore a disadvantage that adhesive elements can be applied only to a smooth workpiece surface, inasmuch as the transport rollers for the carrier tape can only be driven by frictional engagement of the roller against a workpiece.

SUMMARY OF THE INVENTION

Accordingly, it is an object of the invention to provide such a hand-held dispenser and applicator apparatus so designed as to facilitate a much more exact positioning of an adhesive element on a workpiece.

It is a further object of the invention to provide such an apparatus which permits the user to have a clear view of the location on the workpiece that is to receive the adhesive element.

It is another object of the invention to provide such an apparatus which facilitates application of adhesive elements to locations on a workpiece such as might otherwise present problems of relatively difficult access.

In accordance with the invention these objects, and others which will become apparent hereafter, can be dealt with by providing guide means defining a guide path for guiding adhesive-element-bearing carrier tape to a dispensing location and from there for guiding away the carrier tape freed of dispensed adhesive elements; an applicator platform, located along the guide path at the dispensing location, facing towards and freely accessible to workpieces such that an adhesive element on a portion of carrier tape stationarily positioned on the applicator platform can be transferred to the workpiece by the user pressing the platform, and thereby the adhesive element stationarily positioned thereon, against the exact portion of the workpiece at which the latter is to be provided with the adhesive element; and manually activated intermittent-transport means operative for advancing successive adhesive-element-bearing increments of carrier tape along the guide path into position on the applicator platform preliminary to the user pressing the applicator platform and stationarily positioned adhesive element thereon against the intended portion of the workpiece.

The novel features which are considered characteristic for the invention are set forth in particular in the accompanying claims. The invention itself, however, both as to its construction and its method of use, will be best understood from the following description of a merely exemplary although presently preferred embodiment, considered with reference to the accompanying drawings.

DESCRIPTION OF THE PREFERRED EMBODIMENT

Figure 1:
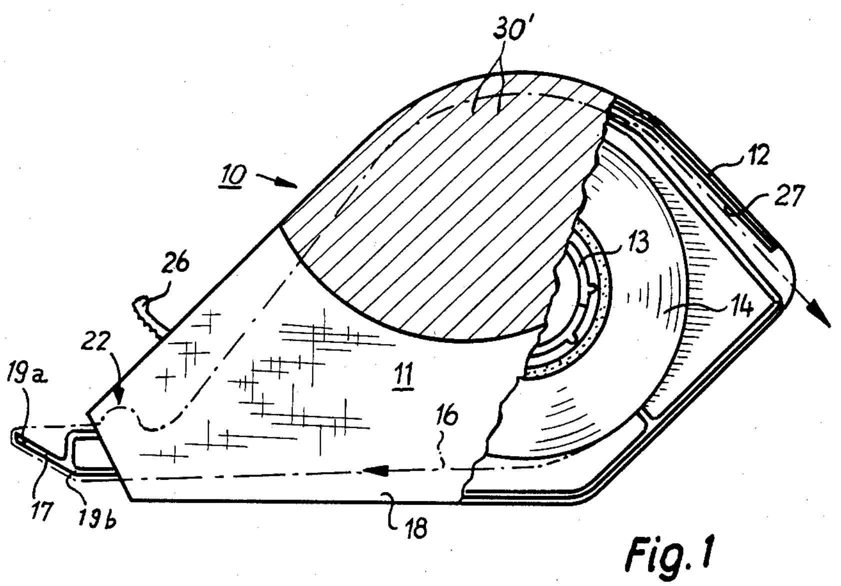
FIG. 1 is a side view of a preferred exemplary embodiment of a hand-held dispenser and applicator apparatus in accordance with the invention, the removable cover of the housing of the apparatus being shown partly broken away.
Figure 2:
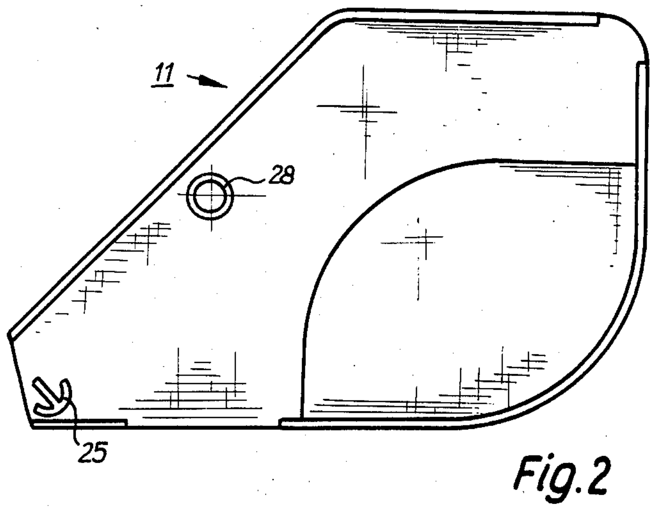
FIG. 2 is a view of the interior face of the removable cover of FIG. 1.

FIG. 1 depicts in side view an inventive hand-held dispenser apparatus 10 whose removable cover 11 (FIG. 2) is shown partly broken away. The apparatus has a housing 12 that can be held by a user in one hand. The housing 12 has secured to it a core 13 which carries a supply roll 14 of adhesion-resisting carrier tape 16, the latter carrying a succession of adhesive elements, such as adhesive labels or photo-mounting stickers, preferably following one after the other on the carrier tape without gaps in between. Such an adhesive element is shown in dash-dot lines at 15 in FIG. 7 and can for example be of generally rectangular outline. West German Pat. No. DE-PS 2,116,984, the disclosure of which is hereby incorporated herein by reference, illustrates by way of example the appearance of a carrier tape bearing such adhesive elements.

Figure 13:
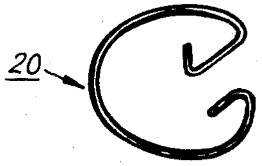
FIG. 13 depicts the rotation-retarding spring that retards rotation of the tape supply roll in tape-unwinding direction.

A rotation-retarding means, such as a spring 20 shown in FIG. 13, is provided intermediate the non-rotary roll-holding core 13 and the tape roll 14 to prevent tape thereon from unwinding too freely. The carrier tape, carrying adhesive elements that are adhesive on one or both their faces, is guided from the supply roll 14 to an applicator platform 17 arranged on a dispensing projection which projects out from the apparatus housing 12 in the fashion of an out-poking finger and which simultaneously serves to establish a bend in the path along which adhesive-element-bearing carrier tape is guided towards the applicator platform 17. The applicator platform 17 is ergonomically designed in such a fasion that an adhesive-element-bearing length of carrier tape positioned thereon can be easily and rather exactly pressed against an intended location on the surface of a workpiece, and even be pressed against a corner portion of a workpiece surface or another such portion that would otherwise be difficult to access. For this purpose the mounting platform 17 is inclined upwardly at an angle of about 20°–40°, preferably about 30°, relative to the bottom face of the base 18 of the apparatus. At its downstream end the applicator platform 17 is provided with a peel-off and deflection edge 19*a*. Carrier tape from which an adhesive element has been removed passes around the peel-off and deflection edge 19*a* and from there travels back into the apparatus housing 12. Upon thusly re-entering housing 12, the carrier tape initially passes at 22 through a transport-retarding channel 23 of generally arcuate shape formed by a semicircular concave channel wall 24 on the housing 12 and a complementary semicircular convex channel wall 25 (FIG. 2) on the interior side of the removable housing cover 11. Transport-retarding channel 23 serves to prevent excessively free tape transport and is automatically opened when the housing cover 11 is removed from housing 12, and conversely is automatically reformed when the cover 11 is placed back on the housing 12.

Downstream of transport-retarding channel 23 the carrier tape 16 is guided through a tape-transport mechanism, shown in FIG. 1 only to the extent of the manually accessible end of a drive lever 26. Downstream of the latter the carrier tape 16 passes into a guide channel 27 formed in the housing 12, and at the end of guide channel 27 emerges exteriorly of the apparatus where it can be torn off, its role having been performed.

The cover 11 is releasably secured on the housing 12 by virtue of the edge of the cover snapping into or tightly fitting into engagement with the housing. To improve the user's grip on the hand-held apparatus, the cover 11 is provided on the exterior thereof with longitudinal ribs 30', and similar ribs on the exterior of housing 12. As can be seen, the applicator platform 17 and the manual drive lever 26 of the tape-transport mechanism are located close to each other, the transport-retarding location 22 being located therebetween. This facilitates accurate advancement of a length of carrier tape corresponding to the length of an adhesive element 15 on the carrier tape.

Figure 3:
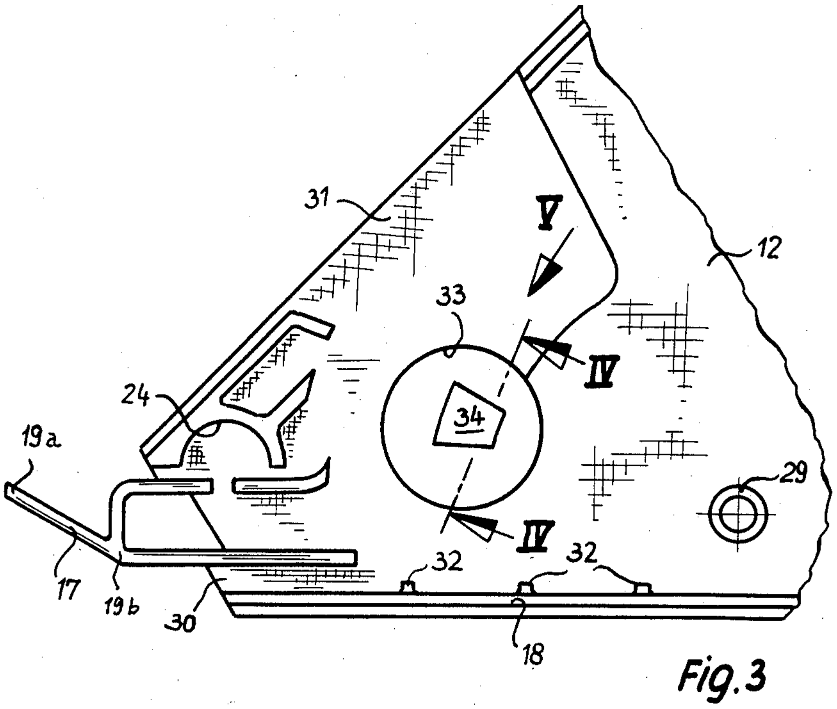
FIG. 3 is a side view of the forwards portion of the apparatus, with the housing's cover off and the tape-transport mechanism of the apparatus removed, showing the applicator platform of the apparatus.

FIG. 3 depicts in side view the part of housing 12 adjoining the applicator platform 17. Housing 12 has an opening 30 out through which the mounting platform 17 extends, the latter being conveniently designed of one piece with housing 12. housing 12 is provided at its top face with an opening 13 out through which the aforementioned manual drive lever 26 (FIG. 1) extends. The bottom wall 18 of housing 12 is provided on its interior with ribs 32 to prevent adhesive elements on the carrier tape from adhering to the bottom wall 18.

Figure 4:
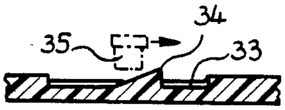
FIG. 4 is a section taken along line IV—IV of FIG. 3.
Figure 5:
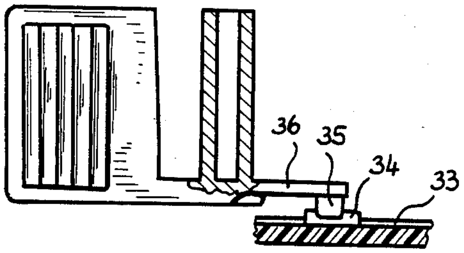
FIG. 5 is a view of a part of the interior of the apparatus, partly sectioned, as seen along viewing arrow V in FIG. 3, depicting the manual drive lever but not the transport lever of the tape-transport mechanism.

The wall of housing 12 that faces the removable cover 11 is provided with a circular depression 33 in the middle of which there is located a cam 34 having a three-dimensional camming surface. Cam 34 has a first camming surface portion approximately in the form of a ramp which rises (as viewed in FIG. 3) from the cam's lower left corner to its upper right corner, so that when viewed in FIG. 4 along section IV—IV of FIG. 3, the cam appears sawtooth-shaped. This ramp-like first camming surface portion is tracked by a cam-following pin 35 (FIGS. 4, 5) provided on an extension 36 of the drive lever 26; the extension 36 is resiliently deflectable in direction normal to the general plane within which the remainder of the drive lever 24 swings. During tape transport the cam-following pin 35 rises along the aforementioned sloping first camming surface of cam 34 (as indicated in FIG. 4) and thereafter snaps down when it has rached the high end of the sloping cam surface.

Figure 10:
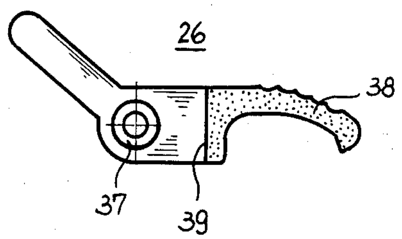
FIGS. 10–12 depict the manual drive lever of the tape-transport mechanism as seen from different directions.
Figure 11:
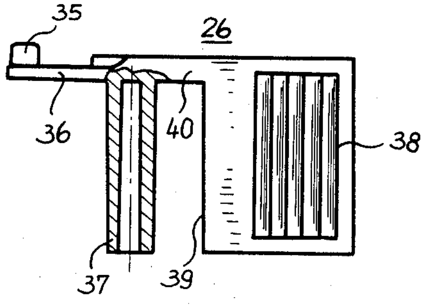
Figure 12:
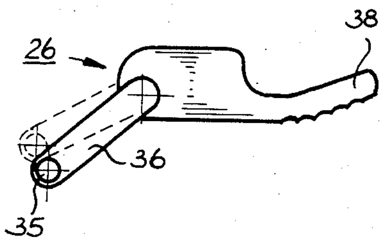

FIGS. 10–12 depict the manual drive lever 26. The latter has a pivot axle 37, a manually engaged grip portion 38, and a clamping portion 39, the grip portion 38 being connected via a relatively thin web 40 to the pivot axle 37 and the resiliently deflectable extension 36 of the latter.

Figure 6:
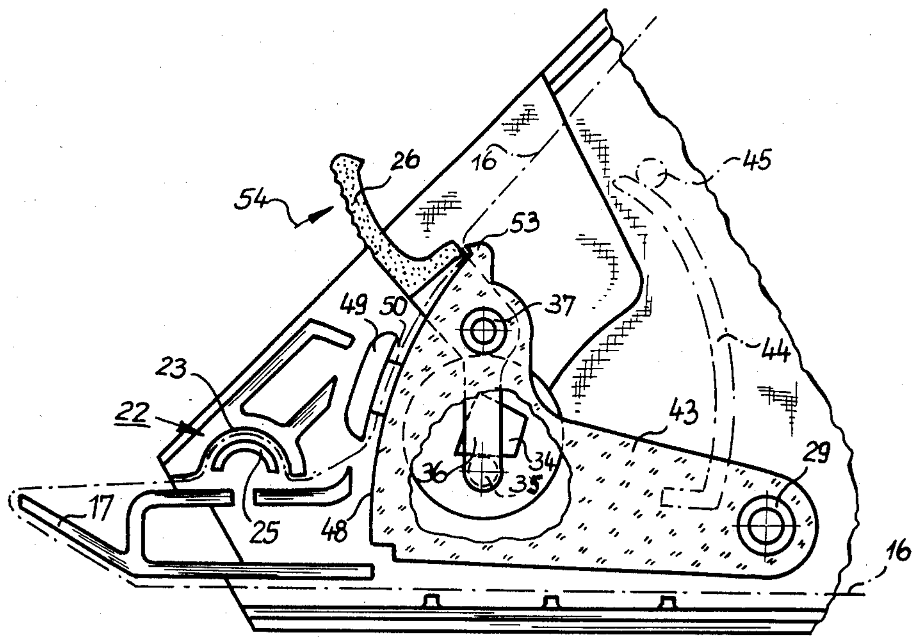
FIG. 6 is a view similar to FIG. 3, with the tape-transport mechanism installed in place, at the start of a tape-transport operation.

As shown, e.g., in FIG. 6, the manual drive lever 26 is pivotally secured to a transport lever 43 which in turn is pivotally secured to a pivot axle 29 on the housing. A biasing spring 44, which can be made of plastic or metal, (see FIG. 6) has one end braced against a projection 45 on the housing and with its other end biases the transport lever counterclockwise.

Figure 9:
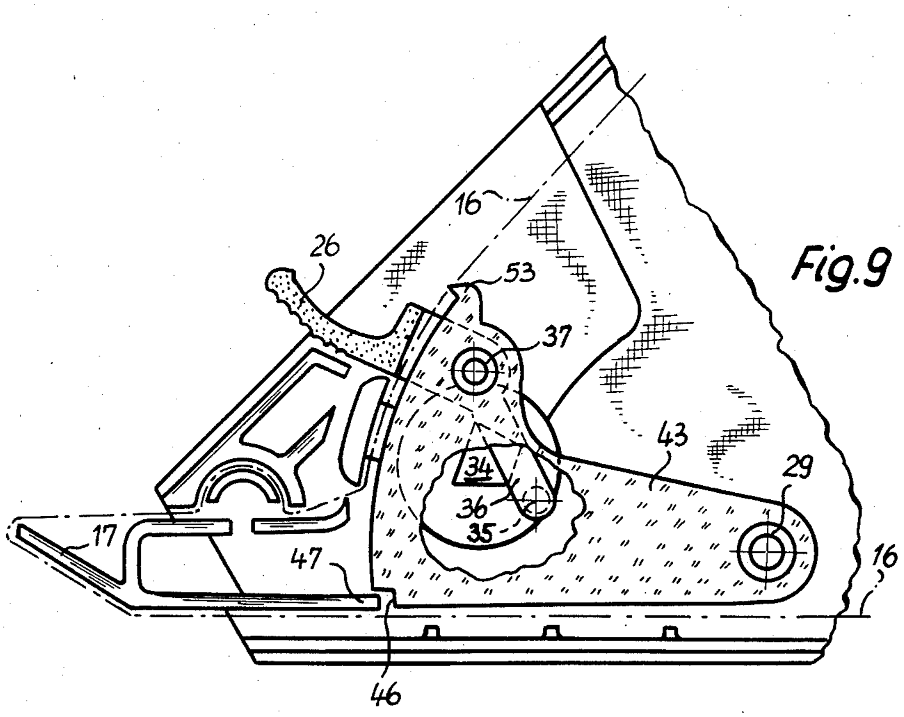
FIG. 9 is a view similar to FIGS. 6–8, showing the tape-transport mechanism in its rest or idle setting.

Transport lever 43 has very roughly a triangular outline. In the vicinity of one of the acute vertices there is located the aforementioned pivot axle 29 on the apparatus housing. The clockwise-following vertex is provided with a notch 46 which serves (as shown in FIG. 9) as an abutment against a wall portion 47 of the apparatus housing and defines the rest or idling position for transport lever 43. At the third vertex of this triangle there is located the pivot axle 37 for the manual drive lever 26. The transport lever 43, at the side 48 thereof remote from pivot axle 29, is shaped convex and provided with a guide element 49 which forms between itself and the convex side 48 a guide channel 50 for carrier tape 16. At its upper end the convex side 48 is provided with an outwardly projecting, hook-like clamping projection 53 which participates in a manner described below to effect tape transport by means of clamping engagement with the tape.

The aforementioned clamping-engagement tape transport is performed in a manner that can be understood with reference to FIGS. 6–9.

FIG. 6 depicts the tape-transport mechanism at the beginning of a tape-transport cycle. The length of carrier tape presently located at the inclined applicator platform 17 no longer carries an adhesive element, the latter having been previously transferred onto a workpiece. The manually engaged drive lever 26 is now swung by the user clockwise in the direction of arrow 54. As a result the clamping edge 39 (FIGS. 10, 11) on the drive lever 26 presses against the clamping projection 53, the carrier tape 16 becoming clamped between edge 39 and projection 53. Simultaneously, the cam-follower pin 35, as shown in FIG. 6, assumes a position at the bottom end of the three-dimensional cam 34.

Figure 7:
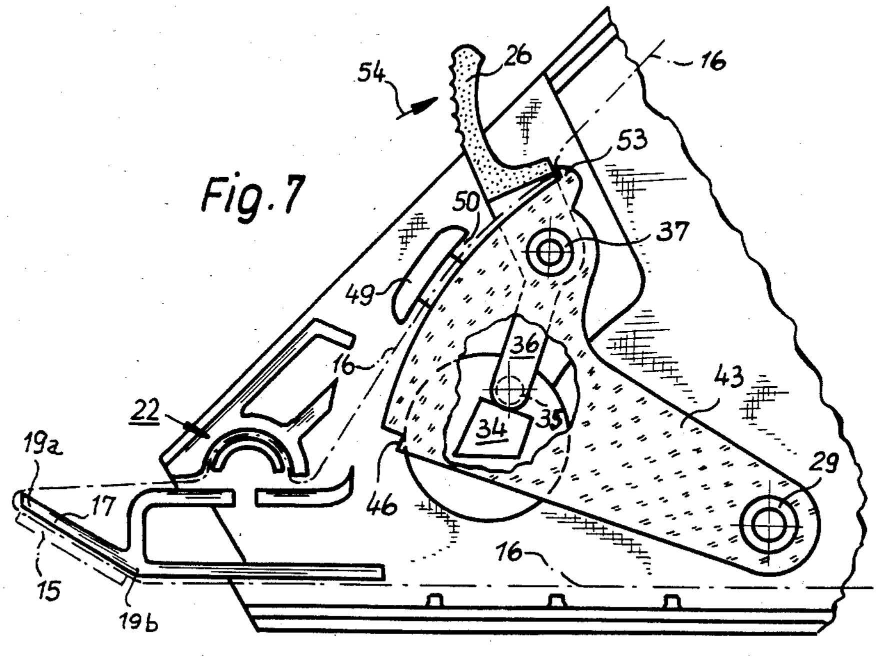
FIG. 7 is a view similar to FIG. 6, towards the end of a tape-transport operation.

FIG. 7 depicts the tape-transport mechanism after the drive lever 26 has been manually swung a bit further in the clockwise direction. During such further clockwise motion of the drive lever 26, the latter presses the transport lever 43 clockwise against the action of the latter's biasing spring 44 (FIG. 6), the lever 43 swinging clockwise about its pivot axle 29. During such lever motion the carrier tape 16, clamped between the levers 26 and 43, is pulled upwards. During this tape-transport action, the transport-retarding structure at 22 retards tape transport so that the tape is transported no more than a distance corresponding to the transport stroke of lever 43. During such tape transport action, the cam-following pin 35 tracks the sloping first camming surface of cam 34 (namely, travelling from the FIG. 6 to the FIG. 7 position of the pin), causing the extension 36 of drive lever 26 to be resiliently deflected by an increasing amount. When cam-tracking pin 35 reaches the upper end (as shown in FIG. 7) of the cam 34, it snaps down (normal to the FIG. 7 picture plane) into engagement with the upper flank of the cam, so that it will be prevented from re-tracking the sloping cam surface in the opposite direction. When the two levers 26, 43 have effected this amount of tape transport, then as shown in FIG. 7 the tape 16 has been advanced a distance such as to bring the next adhesive element 15 on the tape into a position on applicator platform 17 such that the adhesive element's leading edge is located at the peel-off edge 19*a* of the applicator platform. To prevent the user from shifting drive lever 26 still further in the direction of arrow 54, one or more stops, non-adjustable or adjustable, can be provided in the interior of the apparatus housing, to correspondingly limit the range of swinging motion of lever 26 and/or lever 43, for example a stop could be provided at the location in FIG. 7 where the lead line from numeral 43 crosses the outline of lever 43. With the new adhesive element 15 now in proper position on the applicator platform 17, the user can tilt the whole apparatus counterclockwise a small amount to bring the applicator platform 17 into parallel engagement with the surface of a workpiece, whereupon the user then presses the apparatus and thereby the applicator platform against the workpiece to effect adhesion of element 15 to the workpiece. When the user has pressed the applicator platform 17 against the workpiece surface sufficiently he may then pull the apparatus as a whole away from the workpiece, whereupon the adhesive element 15 will adhere to the workpiece and not to the adhesion-resistant carrier tape 16. During the time the user is pressing the applicator platform 17 against the workpiece, and during the time the user is pulling the apparatus away from the transferred adhesive element, the user keeps the drive lever 26 in the FIG. 7 position, so that the length of tape downstream of peel-off edge 19*a* will remain clamped between levers 26, 43 and be incapable of reverse travel in the event of any tendency of the carrier tape to improperly remain adhered to the transferred adhesive element when the user pulls the apparatus away from the workpiece.

The fact that the adhesive-element-free carrier tape downstream of peel-off edge 19*a* forms an angle greater than 90° with the length of carrier tape associated with the adhesive element 15 shown in FIG. 7, facilitates the action of peel-off edge 19*a*, so that, as viewed in FIG. 7, the carrier tape increment associated with the shown adhesive element 15 tends to peel from element 15 beginning at the leading end of element 15 (i.e. at the end near edge 19*a*). This peel-off action is made even more definite and reliable by the fact that the length of carrier tape downstream of peel-off edge 19*a* is clamped between levers 26 and 43 during the peel-off. Because of such clamping action, the most reliable way to remove the apparatus away from the adhesive element 15 after the latter's transfer is to tilt the apparatus somewhat clockwise as viewed in FIG. 7, to guarantee that the peel-off begins at the end of adhesive element 15 nearest peel-off edge 19*a*. Whereas applicator platform 17 is provided with such peel-off edge 19*a* at its downstream end, at its upstream end it is provided with a hold-down edge 19*b*. After the user has pressed the applicator platform 17 and adhesive element 15 thereon against the surface of a workpiece, and then tilts the apparatus clockwise to peel it away from the transferred adhesive element, the hold-down edge 19*b* can conveniently be used as a fulcrum for such tilting motion and be pressed against the workpiece during such tilting motion, so that carrier tape located upstream of hold-down edge 19*b* not in any event pull out of the apparatus housing during the time the apparatus is being peeled away from the transferred adhesive element.

Because the applicator platform 17 projects out from the apparatus housing like an out-poking finger, it is highly visible to the user as he moves the apparatus and the applicator platform thereof towards engagement with an intended surface portion of the workpiece. In particular when the applicator platform 17 has a shape and dimensions substantially corresponding to the adhesive elements 15, the user can very readily appreciate where the adhesive element is located as he brings the applicator platform 17 into engagement against the workpiece. Also, as a further result of the applicator platform 17 projecting thusly from the apparatus housing, the user can see a substantial portion of the workpiece surface, including the location where the adhesive element is to be applied, even when the applicator platform 17 and adhesive element 15 have been brought very close to and almost engaging the workpiece surface.

After having effected transfer of the FIG. 7 adhesive element 15 to the workpiece and after having pulled the apparatus away from the workpiece, the user can let go of the drive lever 26. As a result the biasing spring 44 (shown only in FIG. 6) tries to swing the transport lever 43 counterclockwise about the pivot axle 29. As the spring 44 presses lever 43 counterclockwise, the transport lever 43 transmits via the drive lever's pivot axle 37 a pressing force to the drive lever's extension 36, thereby pressing the cam-following pin 35 at the end of extension 36 downwards (as viewed in FIG. 7) into firm camming engagement with the upper camming surface of cam 34, the position shown in FIG. 7. As a result, cam-following pin 35 begins to slide downwardly along this top camming surface, thereby tilting drive lever 26 counterclockwise about its pivot axle 37 on the transport lever 43. As a result, the drive lever 26 moves out of clamping engagement with the clamping projection 53 of lever 43, thus terminating the clamping action exerted on the carrier tape 16. This assures that, during return travel of the levers 26, 43, reverse transport of tape, leading to jamming and the like, will not occur. As both the drive lever 26 and transport lever 43 swing counterclockwise from their FIG. 7 positions to perform their return strokes, cam-following pin 35 slides down the upper face of cam 34 until it reaches the lower edge of that face, after which point it does not again engage any part of the cam 34 during the remainder of the return strokes of the levers 26, 43.

Figure 8:
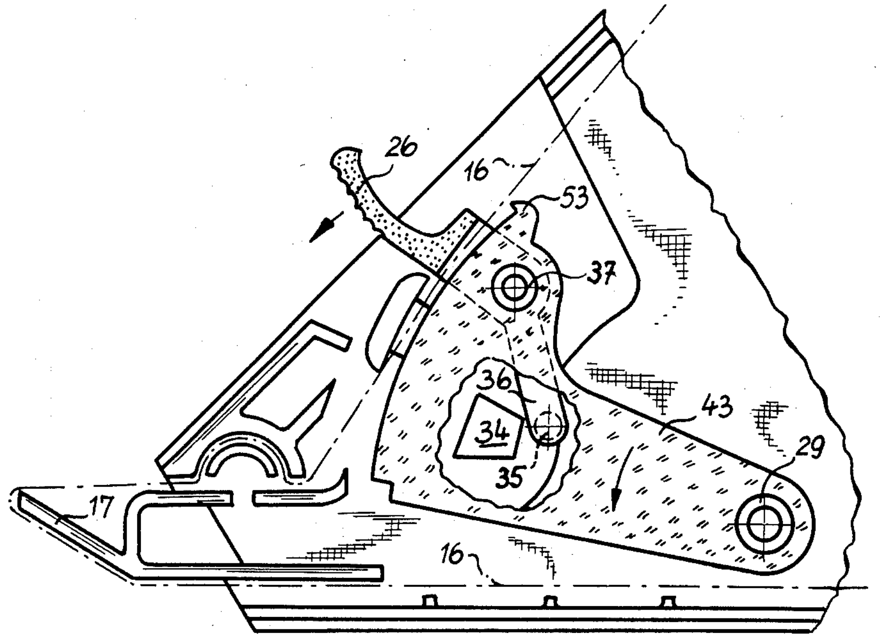
FIG. 8 is a view similar to FIGS. 6 and 7, but showing the tape-transport mechanism in the setting it occupies at a certain time during its reverse motion, which does not transport or influence the carrier tape.

Namely, as shown in FIG. 8, about halfway through the return stroke of levers 26, 43, pin 35 is free and clear of cam 34. If during the return stroke, the user has not entirely removed his hand from drive lever 26, but instead keeps exerting thereon a certain light force tending to tilt lever 26 clockwise, the follower pin 35 would engage the right face of cam 34, and thereby prevent the lever 26 from tilting clockwise again, i.e. clockwise relative to the counterclockwise-turning lever 43, namely to thus assure that the tape 16 not be again clamped between the clamping portions of levers 26 and 43 during this further part of these levers' return stroke. How this right face of cam 34 prevents renewed clamping during the corresponding part of the return stroke will be visually evident from the position of the follower pin 35 relative to the cam 34 in FIG. 8.

FIG. 9 depicts the transport lever 43 in its rest or idle position, in which its notch 46 bears against the wall 47 of housing 12. The clamping portions of drive lever 26 and transport lever 43 are out of engagement with each other, but can be brought into clamping engagement with each other again by again manually turning the drive lever 26 clockwise from the FIG. 9 position thereof. Namely, as shown in FIG. 9, the follower pin 35 is now located lower than any portion of cam 34, and if the drive lever 26 is now manually tilted clockwise, the follower pin 35 will move again to its FIG. 6 position at the bottom or thin end of the ramp-like first camming surface, and another tape-transport operation can now be performed.

The three-dimensional cam 34 and the resilient extension 36 of drive lever 26 thus produce a very simple and reliable programming of the clamping-unclamping sequence; i.e., during tape transport in the forwards direction, the clamping action is automatically established at the correct time, whereas for the return strokes of the drive and transport levers the clamping action is automatically terminated at the correct time. It will be evident that the resilient extension 36 can be made of various resilient materials, and that the cam 34 can be made of other and different shapes that are functionally equivalent, for example if it and the path of travel of the follower pin 35 are located other than as shown in the exemplary embodiment.

In each of FIGS. 6–9, the transport lever 43 is shown broken away in the middle region thereof, in order to expose the three-dimensional cam 34 and the cam-follower pin 35 to view. Naturally, the cam could be provided on the removable cover 11, in which event in FIGS. 6–9 the follower pin 35 would have to project upwardly out of the picture plane instead of downwardly into the picture plane.

It will be apparent that numerous modifications of the exemplary embodiment can be made using routine skill. Whereas many of the features of the disclosed embodiment are presently preferred because of their simplicity and low expense, modifications of a more costly nature can obviously be provided. For example, instead of all the tape-transport motion being derived from the user's hand motion, a wound-up drive spring, or even an electric motor could in principle be provided, operative for performing a transport motion in response to a pushbutton being manually depressed, and so forth.

What is considered new and of patentable significance is set forth in the appended claims.

I claim:

1. Hand-held dispenser and applicator apparatus designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, the manually activated intermittent-transport means comprising a drive element at least a portion of which is accessible to and movable by the hand of a user and motion-converting means converting the user's hand motion upon the drive element into tape transport motion, and being provided with clamping portions movable relative to each other between a first, clamping position in which said clamping portions clamp the carrier tape between themselves in order to effect tape transport and a second, non-clamping position in which said clamping portions do not clamp the carrier tape between themselves.

2. An apparatus as defined in claim 1, the apparatus having a housing, said drive element being a drive lever accessible to the user's hand, said motion-converting means comprising a transport lever pivotally secured to the housing, the drive lever being pivotally secured to the transport lever, said clamping portions comprising one clamping portion provided on the drive lever and another clamping portion provided on the transport lever, the drive lever being manually movable from said second, non-clamping position relative to the transport lever into said first, clamping position.

3. Hand-held dispenser and applicator apparatus designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, wherein said applicator platform projects away from the remainder of the apparatus with a configuration and in a direction such as to facilitate the user seeing the applicator platform and thereby judging the position of an adhesive element thereon as well as seeing the portion of the workpiece surface that is to receive the adhesive element.

4. An apparatus as defined in claim 3, wherein said intermittent-transport means comprises means operative for applying transport force to the carrier tape independently of whether the applicator platform is in engagement with a workpiece.

5. An apparatus as defined in claim 3, wherein said manually activatable intermittent-transport means comprises a manual drive element accessible to and movable by the hand of a user and means converting the user's hand motion upon the drive element into tape transport motion, all the tape transport motion being thusly derived from the user's hand motion.

6. An apparatus as defined in claim 3, the applicator platform having an upstream end and a downstream end, as considered in the direction in which carrier tape is transported along the guide path, the apparatus having an external housing, the applicator platform projecting from said external housing with an orientation such that the upstream end of the applicator platform is relatively closer to the housing and the downstream end relatively farther therefrom.

7. An apparatus as defined in claim 6, the applicator platform projecting from said external housing in the manner of an out-poking finger.

8. An apparatus as defined in claim 3, wherein said intermittent-transport means comprises means operative for applying transport force to the carrier tape independently of whether the apparatus is in engagement with a workpiece.

9. An apparatus as defined in claim 3 or 8, the applicator platform having an upstream end and a downstream end, as considered in the direction in which carrier tape is transported along the guide path, the apparatus furthermore being provided with means defining a peel-off edge located along said guide path at the downstream end of the applicator platform.

10. An apparatus as defined in claims 1, 3, or 8, the applicator platform having an upstream end and a downstream end, as considered in the direction in which carrier tape is transported along the guide path, furthermore including means defining a hold-down edge located along said guide path at the upstream end of the applicator platform, whereby after the user finishes pressing the applicator platform and adhesive-element-bearing carrier tape thereon against a workpiece, the user can, if necessary to facilitate peel-off, tilt the mounting platform and carrier tape thereon away from the transferred adhesive element while using the hold-down edge as a fulcrum.

11. An apparatus as defined in claims 1, 3, or 8, the applicator platform having an upstream end and a downstream end, as considered in the direction in which carrier tape is transported along the guide path, furthermore including means forming a peel-off edge located at the downstream end of the applicator platform and a hold-down edge located at the upstream end of the applicator platform, whereby after the user finishes pressing the applicator platform and adhesive-element-bearing carrier tape thereon against a workpiece, the user can, if necessary to facilitate peel-off, tilt the applicator platform and the carrier tape thereon away from the transferred adhesive element while using the hold-down edge as a fulcrum for such tilting and while pressing the hold-down edge against the workpiece to prevent carrier tape upstream of the hold-down edge from being pulled from the apparatus during the peel-off, and furthermore including means engaging the carrier tape downstream of the peel-off edge and operative for preventing such downstream carrier tape from being pulled from the apparatus during the peel-off.

12. An apparatus as defined in claim 8, wherein said manually activatable intermittent-transport mans comprises means incapable of effecting carrier tape transport by more than a predetermined limited distance per manual actuation, whereby to advance per manual actuation a length of carrier tape no greater than needed to bring the next adhesive element into position at said applicator platform.

13. An apparatus as defined in claim 8, including means operative for preventing tape travel after the intermittent-transport means has performed a transport operation, so that an adhesive-element-bearing increment of carrier tape is position on the applicator platform will retain its position when the applicator platform is brought into engagement with and pressed against a workpiece.

14. An apparatus as defined in claim 8, including means operative for preventing tape travel after the applicator platform and thus an adhesive element thereon has been pressed against the wworkpiece, so that the applicator platform and carrier tape supported thereon can then be pulled away from the transferred adhesive element without causing carrier tape to be pulled out of the apparatus by adhesion to the transferred adhesive element.

15. An apparatus as defined in claim 8, the apparatus being adapted to dispense and apply double-stick adhesive elements that are adhesive on both surfaces thereof.

16. An apparatus as defined in claim 15, furthermore including a ribbed structure upstream of the applicator platform along that side of the guide path towards which double-stick adhesive elements on a carrier tape face, thereby to prevent double-stick adhesive elements from firmly adhering to said side of the guide path.

17. An apparatus as defined in claim 8, the applicator platform having an upstream end and a downstream end, as considered in the direction in which carrier tape is transported along the guide path, the apparatus having an external housing, the applicator platform projecting from said external housing with an orientation such that the upstream end of the applicator platform is relatively closer to the housing and the downstream end relatively farther therefrom.

18. An apparatus as defined in claim 17, the applicator platform projecting from said external housing in the manner of an out-poking finger.

19. An apparatus as defined in claims 6, 7, 17 or 18, furthermore including means defining a hold-down edge located along said guide path at the upstream end of the applicator platform, whereby after the user finishes pressing the applicator platform and adhesive-element-bearing carrier tape thereon against a workpiece, the user can, if necessary to facilitate peel-off, tilt the mounting platform and carrier tape thereon away from the transferred adhesive element while using the hold-down edge as a fulcrum.

20. An apparatus as defined in claims 6, 7, 17 or 18, furthermore including means forming a peel-off edge located at the downstream end of the applicator platform and a hold-down edge located at the upstream end of the applicator platform, whereby after the user finishes pressing the applicator platform and adhesive-element-bearing carrier tape thereon against a workpiece, the user can, if necessary to facilitate peel-off, tilt the applicator platform and the carrier tape thereon away from the transferred adhesive element while using the hold-down edge as a fulcrum for such tilting and while pressing the hold-down edge against the workpiece to prevent carrier tape upstream of the hold-down edge from being pulled from the apparatus during the peel-off, and furthermore including means engaging the carrier tape downstream of the peel-off edge and operative for preventing such downstream carrier tape from being pulled from the apparatus during the peel-off.

21. Hand-held dispenser and applicator apparatus designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, the applicator platform having an upstream end and a downstream end, as considered in the direction in which carrier tape is transported along the guide path, the apparatus furthermore being provided with means defining a peel-off edge located along said guide path at the downstream end of the applicator platform, furthermore including means defining a hold-down edge located along said guide path at the upstream end of the applicator platform, whereby after the user finishes pressing the applicator platform and adhesive-element-bearing carrier tape thereon against a workpiece, the user can, if necessary to facilitate peel-off, tilt the mounting platform and carrier tape thereon away from the transferred adhesive element while using the hold-down edge as a fulcrum.

22. Hand-held dispenser and applicator apparatus designed to dispense adhesive labels, stickers, or other such adhesive elements that are adhesive on at least one of the faces tereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, the applicator platform having an upstream end and a downstream end, as considered in the direction in which carrier tape is transported along the guide path, furthermore including means forming a peel-off edge located at the downstream end of the applicator platform and a hold-down edge located at the upstream end of the applicator platform, whereby after the user finishes pressing the applicator platform and adhesive-element-bearing carrier tape thereon against a workpiece, the user can, if necessary to facilitate peel-off, tilt the applicator platform and the carrier tape thereon away from the transferred adhesive element while using the hold-down edge as a fulcrum for such tilting and while pressing the hold-down edge against the workpiece to prevent carrier tape upstream of the hold-down edge from being pulled from the apparatus during the peel-off, and furthermore including means engaging the carrier tape downstream of the peel-off edge and operative for preventing such downstream carrier tape from being pulled from the apparatus during the peel-off.

23. Hand-held dispenser and applicator apparatus designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpieces by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, the applicator platform having an upstream end and a downstream end, as considered in the direction in which carrier tape is transported along the guide path, the apparatus furthermore being provided with means defining a peel-off edge located along said guide path at the downstream end of the applicator platform, the apparatus having an external housing, the applicator platform projecting from said external housing with an orientation such that the upstream end of the applicator platform is relatively closer to the housing and the downstream end relatively farther therefrom.

24. An apparatus as defined in claim 23, wherein the applicator platform projects from said external housing in the manner of an out-poking finger.

25. Hand-held dispenser and applicator apparatus designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, the applicator platform having an upstream end and a downstream end, as considered in the direction in which carrier tape is transported along the guide path, the apparatus furthermore being provided with means defining a peel-off edge located along said guide path at the downstream end of the applicator platform, the apparatus having an external housing, the means defining the peel-off edge at the downstream end of the applicator platform being of one piece with the applicator platform, and the applicator platform being of one piece with the external housing.

26. Hand-held dispenser and applicator apparator designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, wherein said manually activatable intermittent-transport means comprises a manual drive element accessible to and movable by the hand of a user and means converting the user's hand motion upon the drive element into tape transport motion, all the tape transport motion being thusly derived from the user's hand motion, the apparatus having a housing, the manual drive element comprising a drive lever accessible to the user's hand, the means converting the user's hand motion upon the drive element into tape transport motion comprising a transport lever pivotally secured to the housing, the driving lever being pivotally secured to the transport lever, cooperating clamping portions on the drive lever and the transport lever, the drive lever being manually movable from a non-clamping position relative to the transport lever into a clamping position in which said clamping portions on the drive and transport levers clamp the carrier tape between themselves to effect carrier-tape transport upon continued drive lever motion, and cam means, including a cam having a three-dimensional camming surface secured to the housing and a cam-following portion on the drive lever, operative for influencing the positions of the drive lever and transport lever relative to each other during lever motion.

27. An apparatus as defined in claim 26, wherein the drive lever and transport lever are pivotable in a common general plane, the cam-following portion on the drive lever being provided on an extension of the latter which is deflectable in direction normal to said general plane, the three-dimensional camming surface having a camming-surface portion shaped and oriented to cause said extension to deflect normal to said plane during the tape-transporting motion of the drive and transport levers.

28. An apparatus as defined in claim 27, wherein the camming surface furthermore is so shaped that, upon completion of a tape-transporting motion by said levers, said cam-following portion on said deflectable extension of the drive lever comes to the end of said camming-surface portion and snaps into engagement with a second camming-surface portion configured to cause the drive lever to move out of clamping engagement with the transport lever.

29. An apparatus as defined in claim 28, wherein said second camming-surface portion has dimensions and location such that, after the drive lever has been cammed out of clamping engagement with the transport lever, said cam-following portion comes to the end of said second camming-surface portion and thereafter no longer encounters a camming surface during motion of the drive lever in direction opposite to the tape-transporting direction.

30. Hand-held dispenser and applicator apparatus designed to dispense adhesive labels, stickers, or other such adhesive elements that are adhesive on at least one of the faces thereof, from a supply of such adhesive elements adhesively carried on a carrier tape, and furthermore designed to apply such adhesive elements to documents, cartons, album pages, or to other such workpieces, the dispenser and applicator apparatus comprising guide means defining a guide path for guiding adhesive-element-bearing carrier tape to a dispensing location and from there for guiding away the carrier tape freed of dispensed adhesive elements, an applicator platform, located along said guide path at said dispensing location, facing towards and freely accessible to workpieces such that an adhesive element on a portion of carrier tape stationarily positioned on said applicator platform can be transferred to the workpiece by the user pressing the platform and thereby the adhesive element stationarily positioned thereon against the exact portion of the workpiece at which such workpiece is to be provided with an adhesive element, and manually activated intermittent-transport means operative for advancing successive adhesive-element-bearing increments of carrier tape along said guide path into position on said applicator platform preliminary to the user pressing the applicator platform and stationarily positioned adhesive element thereon against the desired portion of the workpiece, the intermittent-transport means engaging the carrier tape in transport-effecting manner at an engagement location downstream of the applicator platform, furthermore including transport-retarding means applying to the carrier tape a transport-retarding force at a location along said guide path intermediate the applicator platform and said engagement location, to thereby prevent the carrier tape from being too freely or uncontrollably transportable.

31. An apparatus as defined in claim 30, wherein the apparatus has an external housing comprising a main housing part accommodating the guided tape and the intermittent-transport means and also a removable cover part, said transport-retarding means comprising a transport-retarding channel through which carrier tape is guided, the channel being formed by first channel-wall portions provided on said main housing part and generally complementary second channel-wall portions provided on said removable cover part.

32. An apparatus as defined in claim 31, wherein said first and second channel-wall portions are furthermore shaped and located to facilitate engagement of said removable cover part with said main housing part.

* * * * *